(12) United States Patent
Weng

(10) Patent No.: US 6,717,900 B2
(45) Date of Patent: Apr. 6, 2004

(54) INTEGRATED COMPACT DISC CLEANING AND LABELING DEVICE

(75) Inventor: Jin-Sheng Weng, Taipei (TW)

(73) Assignee: Taiwan Bor Ying Corporation, Taipei Hsien (TW)

( * ) Notice: Subject to any disclaimer, the term of this patent is extended or adjusted under 35 U.S.C. 154(b) by 315 days.

(21) Appl. No.: 09/885,764

(22) Filed: Jun. 19, 2001

(65) Prior Publication Data

US 2002/0044513 A1 Apr. 18, 2002

(51) Int. Cl.[7] ................................................ G11B 3/58
(52) U.S. Cl. ........................................................ 369/72
(58) Field of Search .......................... 369/72, 289, 291; 156/556; 15/97.1, 88.2, DIG. 14, DIG. 13; 360/128

(56) References Cited

U.S. PATENT DOCUMENTS

| | | | | | |
|---|---|---|---|---|---|
| 5,208,795 A | * | 5/1993 | Lavinsky et al. | ............. | 369/72 |
| 5,416,761 A | * | 5/1995 | Lee | ............. | 369/72 |
| 5,584,089 A | * | 12/1996 | Huang | ............. | 15/97.1 |
| 5,822,822 A | * | 10/1998 | Weng | ............. | 15/97.1 |
| 5,963,526 A | * | 10/1999 | Lee | ............. | 369/72 |
| 6,000,085 A | * | 12/1999 | Weng | ............. | 15/102 |
| 6,243,345 B1 | * | 6/2001 | Kwang | ............. | 369/72 |

* cited by examiner

*Primary Examiner*—A. J. Heinz
*Assistant Examiner*—Angel Castro
(74) *Attorney, Agent, or Firm*—Pro-Techtor International Services

(57) ABSTRACT

An integrated compact disc cleaning and labeling device mainly includes pivotally connected top and bottom covers, a turning plate rotatably fitted in the top cover, a CD cleaner rotatably mounted to one side of the turning plate, a sleeve barrel vertically slidably received in a barrel portion of the bottom cover, and a return spring mounted between the bottom cover and the sleeve barrel. The bottom cover includes an annular seat surrounding the barrel portion for supporting a label thereon. When a compact disc is removably supported on a flat top of the sleeve barrel with a print side facing downward and the top cover is closed onto the bottom cover, the label is attached to the print side of the compact disc. Meanwhile, the CD cleaner could be rotated to effectively clean a signal side of the compact disc and ensure a firm attachment of the label to the compact disc.

7 Claims, 6 Drawing Sheets

INTEGRATED COMPACT DISC CLEANING AND LABELING DEVICE

BACKGROUND OF THE INVENTION

The present invention relates to an integrated compact disc cleaning and labeling device operative to selectively clean and/or label a compact disc depending on actual need.

A compact disc includes a signal side and a print side opposite to the signal side. The signal side tends to be dirtied with dust after being used for a long time and therefore requires periodic or non-periodic maintenance and cleaning to protect its quality and usable life, just as any other products. The print side of the compact disc could be imprinted with text and design or attached with a label to show information about the contents of the compact disc.

Since the compact disc is provided at the signal side with specially structured grooves formed with laser beams, it could be wiped clean only in a substantially radial direction, that is, from a center of the disc toward an outer periphery thereof or from an outer periphery of the disc toward a center thereof. More specifically, a cleaning element must be moved in a direction normal to a circumference of the disc. Any cleaning done in a direction parallel to the circumferential direction of the disc would destruct the laser formed grooves on the disc to largely adversely affect the quality and the usable life of the compact disc.

Concerning the print side of the compact disc, it is usually directly imprinted with information about the contents of the disc if the disc is mass-produced. For other compact discs that are produced at limited small volume or recorded by users, specific labels are separately attached to the print side of the discs. There are also users preferring to label compact discs with specially selected or customized text or design to replace the originally imprinted text or design. However, it is not easy to smoothly attach a very thin label over the print side of the compact disc with hands. A labeling device is usually required to do this.

Many attempts have been made to develop devices for cleaning compact discs. There are also devices available in the markets for smoothing a label on the print side of the compact disc. However, there is not any device currently available in the markets to provide both the functions of cleaning and labeling a compact disc.

SUMMARY OF THE INVENTION

It is therefore a primary object of the present invention to provide an integrated compact disc cleaning and labeling device that could be used to perform two functions, that is, cleaning and labeling, depending on a user's actual need.

To achieve the above and other objects, the integrated laser disc cleaning and labeling device of the present invention mainly includes pivotally connected top and bottom covers, a turning plate rotatably fitted in the top cover, a CD cleaning means rotatably mounted to one side of the turning plate, a sleeve barrel vertically slidably received in a barrel portion of the bottom cover, and a return spring mounted between the bottom cover and the sleeve barrel.

The cleaning means includes a handling knob and a round member respectively located above and below the turning plate. The round member is provided at a bottom surface with a cleaning element and at an outer peripheral wall surface with a circle of continuous and radially outward projected teeth adapted to mesh with a circle of continuous radially inward projected teeth at an inner surface of the top cover.

The bottom cover includes an annular seat portion surrounding the barrel portion for supporting a label thereon and is provided on the barrel portion with a plurality of vertically extended guide slots. An internal base is provided inside the barrel portion.

The sleeve barrel is provided at a vertical wall thereof with pawls having position and number corresponding to that of the guide slots of the bottom cover, and each of the pawls is provided at a lower end with a radially outward projected hook adapted to slide up and down in one of the guide slots. When the sleeve barrel is at a fully lifted position, the hooks of the pawls press against a top of the guide slots. The sleeve barrel also includes an annular flat top portion and a central shaft portion raised from a center of the flat top portion, so that a compact disc may be supported on the flat top portion with a central hole of the disc aligned with the central shaft portion.

When a compact disc is removably supported on the flat top portion of the sleeve barrel with a print side facing downward and the top cover is closed onto the bottom cover, the label positioned on the seat portion of the bottom cover is attached to the print side of the compact disc. Meanwhile, the handling knob of the CD cleaning means could be moved for the turning plate and the cleaning means to revolve about a center of the bottom cover, and for the round member of the cleaning means to mesh with the top cover and thereby rotate about the handling knob at the same time. The revolving and rotating cleaning means could therefore effectively clean a signal side of the compact disc and ensures a firm attachment of the label to the print side of the compact disc.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
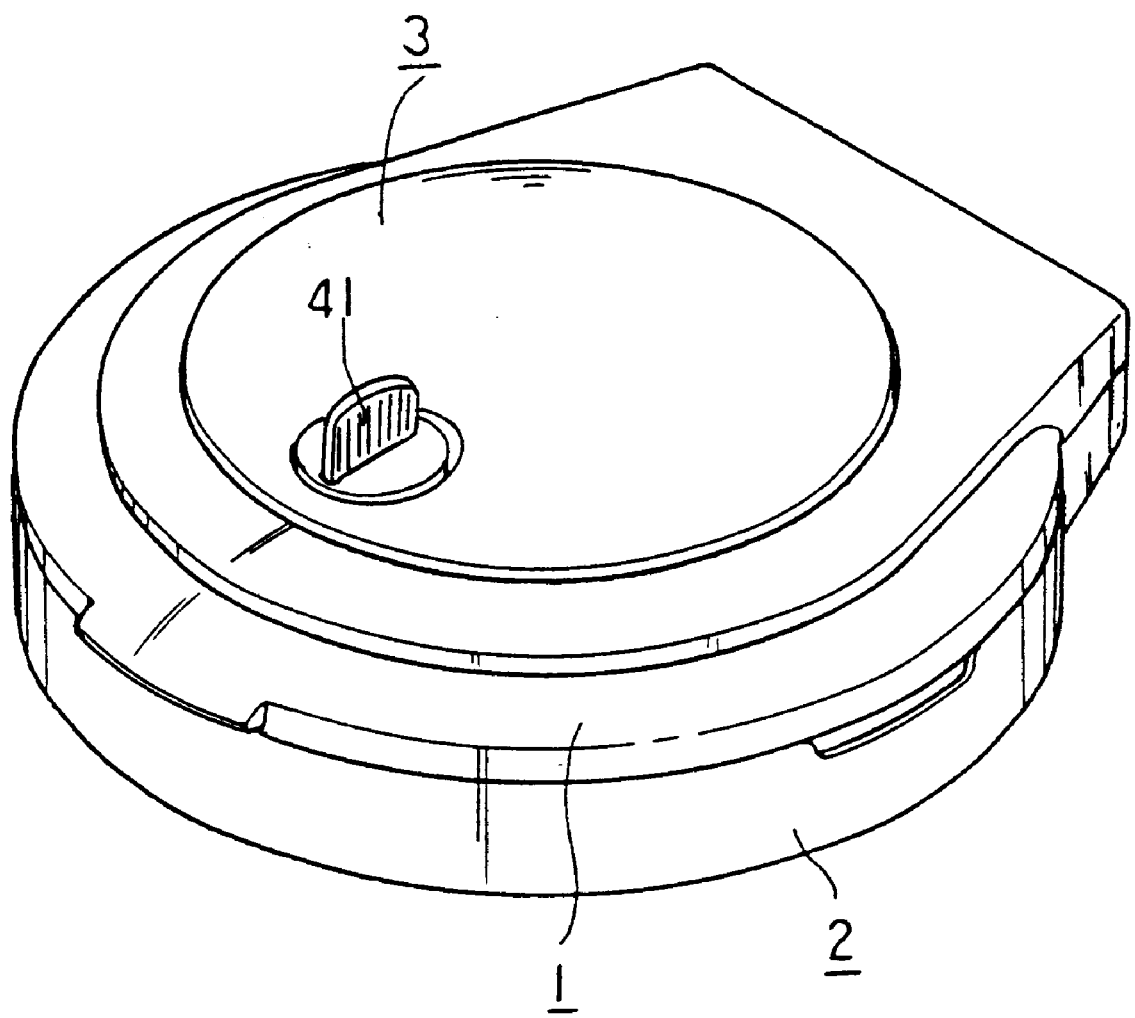
FIG. 1 is a perspective view of an integrated compact disc cleaning and labeling device according to a first embodiment of the present invention.
Figure 2:
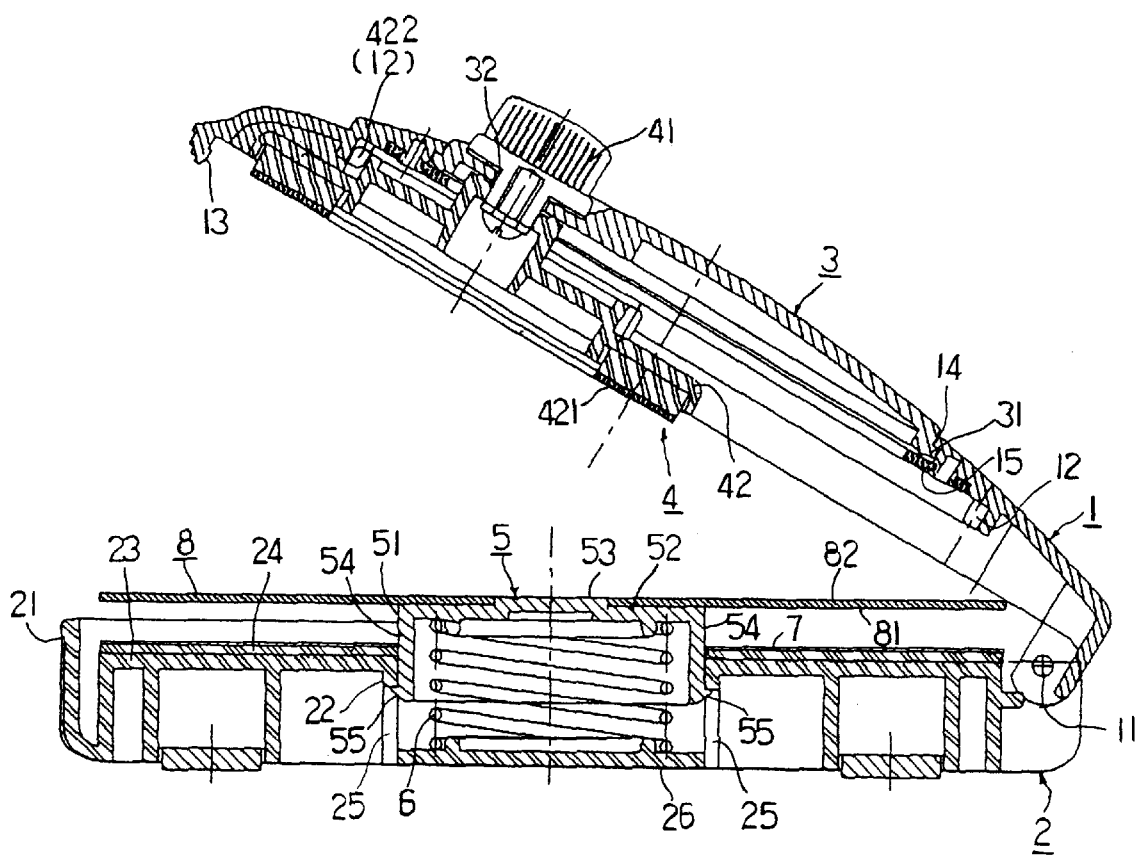
FIG. 2 is a sectional view of FIG. 1, showing the device of the present invention is ready for labeling a compact disc.

Please refer to FIGS. 1 and 2 in which an integrated compact disc cleaning and labeling device according to a first embodiment of the present invention is shown. For clarity purpose, the integrated compact disc cleaning and labeling device is referred to as "the device" and the compact disc as "the CD" hereinafter. As shown, the device mainly includes pivotally connected top cover 1 and bottom cover 2, a turning plate 3 and a CD cleaning means 4 associated with the top cover 1, and a sleeve barrel 5 and a return spring 6 mounted on the bottom cover 2.

The top and the bottom covers 1, 2 are pivotally connected to each other at one side by means of a pivot pin 11, such that the top cover 1 could be lifted from or closed onto the bottom cover 2. The top cover 1 is provided at an inner surface with a circle of continuous and radially inward projected teeth 12. A hook 13 is provided on the top cover 1 opposite to the pivot pin 11, and a retaining hole 21 is provided on the bottom cover 2 corresponding to the hook 13, such that the hook 13 and the retaining hole 21 engage with each other when the top cover 1 is closed onto the bottom cover 2.

The turning plate 3 is in the form of a dish and is rotatably fitted in a round opening 14 provided on the top cover 1 in any available manner. In the illustrated drawings, the turning plate 3 is provided at a lower peripheral edge with a circle of radially extended flange 31 that is adapted to abut against a lower peripheral edge of the round opening 14 of the top cover 1 when the turning plate 3 is upward fitted into the round opening 14 from a lower side of the top cover 1. An annular gasket 15 is fixed to the inner surface of the top cover 1 to shield the flange 31, such that the turning plate 3 is held in place and rotatable relative to the top cover 1.

The CD cleaning means 4 is located below the top cover 1 and rotatably connected to one side of the turning plate 3. The CD cleaning means 4 mainly includes a handling knob 41 upward projected from the turning plate 3, and a round member 42 located below the handling knob 41 and rotatably connected to the latter via a through hole 32 on the turning plate 3. A cleaning element 421, such as a layer of deerskin, is attached to the bottom surface of the round member 42, and a circle of continuous and radially outward projected teeth 422 is provided on an outer peripheral wall of the round member 42 at a predetermined position to mesh with the teeth 12 provided at the inner surface of the top cover 1.

The bottom cover 2 includes a barrel portion 22 and an annular seat portion 23 surrounding the barrel portion 22. A top of the annular seat portion 23 is covered with a layer of mat 24 made of a soft material, such as sponge. The barrel portion 22 is provided at its vertical peripheral wall with a plurality of vertically extended guide slots 25, and at its inner side with an internal base 26.

Figure 3:
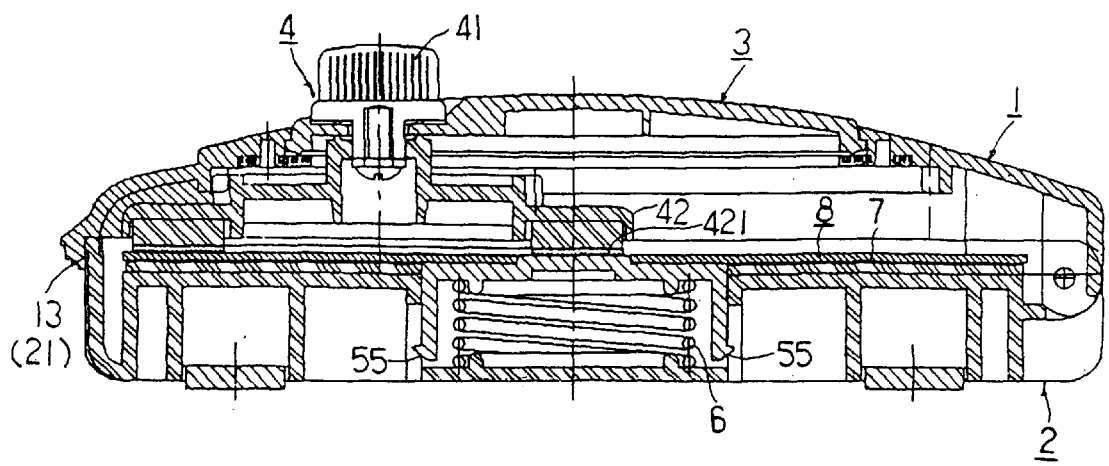
FIG. 3 is another sectional view showing the compact disc in the device of the present invention of FIG. 2 has been labeled.

The sleeve barrel 5 is telescopically received in the barrel portion 22 of the bottom cover 2. The sleeve barrel 5 includes a vertical sleeve portion 51, an annular flat top portion 52, and a shaft portion 53 raised from a center of the flat top portion 52. The sleeve portion 51 includes vertically downward extended pawls 54 having number and position corresponding to that of the vertical guide slots 25 of the barrel portion 22 of the bottom cover 2. Each of the pawls 54 has a radially outward projected hook 55 that is adapted to extend into and slide up and down in a corresponding vertical guide slot 25. When the top cover 1 is closed onto the bottom cover 2 with the hook 13 engaged with the retaining hole 21, as shown in FIG. 3, the hooks 55 of the pawls 54 are moved to a lower dead point in their travel. When the hooks 55 of the pawls 54 are moved to an upper dead point in their travel, as shown in FIG. 2, they will press against a top of the vertical guide slots 25.

The return spring 6 is mounted between the internal base 26 of the bottom cover 2 and the flat top portion 52 of the sleeve barrel 5. When the top cover 1 is closed onto the bottom cover 2 with the hook 13 engaged with the retaining hole 21, it also depresses the sleeve barrel 5 and thereby compresses the return spring 6 below the sleeve barrel 5. When the hook 13 is disengaged from the retaining hole 21, the return spring 6 provides an elastic force to push the sleeve barrel 5 upward and spring open the top cover 1.

Figure 4:
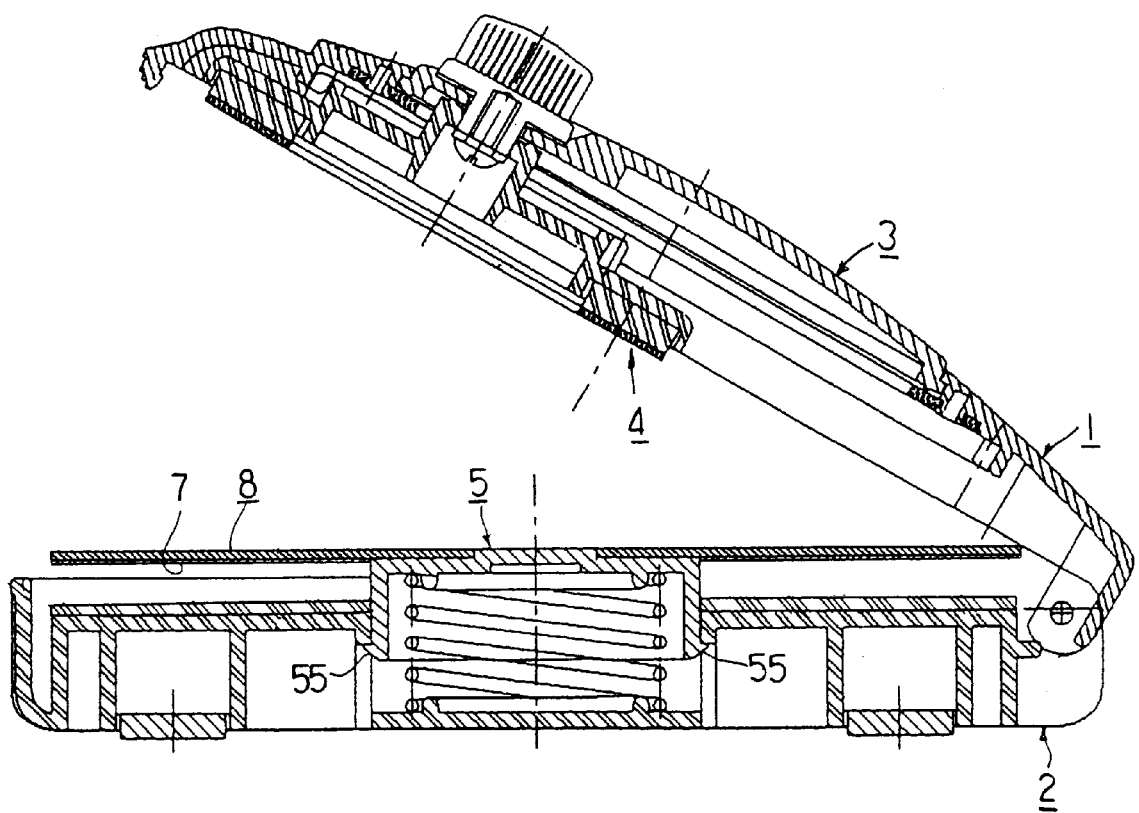
FIG. 4 is a further sectional view showing the labeled compact disc of FIG. 3 is ready for removal from the device of the present invention.

Please refer to FIGS. 2 to 4. To use the device of the present invention to attach a label 7 to a print side 81 of a compact disk 8, first peel off a release paper (not shown) of the label 7 to be attached to the CD 8 and put the label 7 over the mat 24 on the annular seat portion 23 of the bottom cover 2, and then position the CD 8 on the flat top portion 52 of the sleeve barrel 5 with the print side 81 facing downward (that is, a signal side 82 of the CD 8 is faced toward the top cover 1) and a central hole of the CD 8 aligned with the raised central shaft portion 53. Finally, close the top cover 1 for the hook 13 to engage with the retaining hole 21 of the bottom cover 2. At this point, the print side 81 of the CD 8 is in tight contact with the label 7 on the annular seat portion 23.

To enhance the tight contact of the label 7 with the print side 81 of the CD 8 and to clean the signal side 82 of the CD 8 at the same time, a user may, immediately after the above labeling movement, move the handling knob 41 for the cleaning means 4 to revolve about a center of the bottom cover 2. Meanwhile, the radially outward projected teeth 422 on the round member 42 of the cleaning means 4 mesh with the radially inward projected teeth 12 of the top cover 1 to bring the cleaning means 4 to rotate about the knob 41 while revolves about the center of the bottom cover 2. This simultaneous revolving and rotating movement of the cleaning means 4 enables the cleaning element 421 attached to the bottom surface of the round member 42 to wipe in radial direction every area on the signal surface 82 of the CD 8 to effectively clean the CD 8. The rotating and revolving cleaning means 4 applies a balanced downward force on the CD 8 to further ensure the tight contact of the print side 81 of the CD 8 with the label 7. This prevents the user from directly touching and dirtying the CD 8.

After the CD 8 has been sufficiently cleaned and the label 7 has been firmly attached to the print side 81 of the CD 8, the hook 13 is disengaged from the retaining hole 21. At this point, the return spring 6 in the compressed state would immediately spring up to lift the sleeve barrel 5 and the labeled CD 8 supported thereon. The lifting movement stops when the hooks 55 of the pawls 54 of the sleeve barrel 5 slide upward to engage with the top of the vertical guide slots 25 of the bottom cover 2. The user may now remove the labeled CD 8 from the flat top portion 52 of the sleeve barrel 5. The sleeve barrel 5 in this lifted position is ready for labeling a next CD 8.

Of course, the user may also clean the signal side 82 of the CD 8 without conducting the labeling at the same time.

Figure 5:
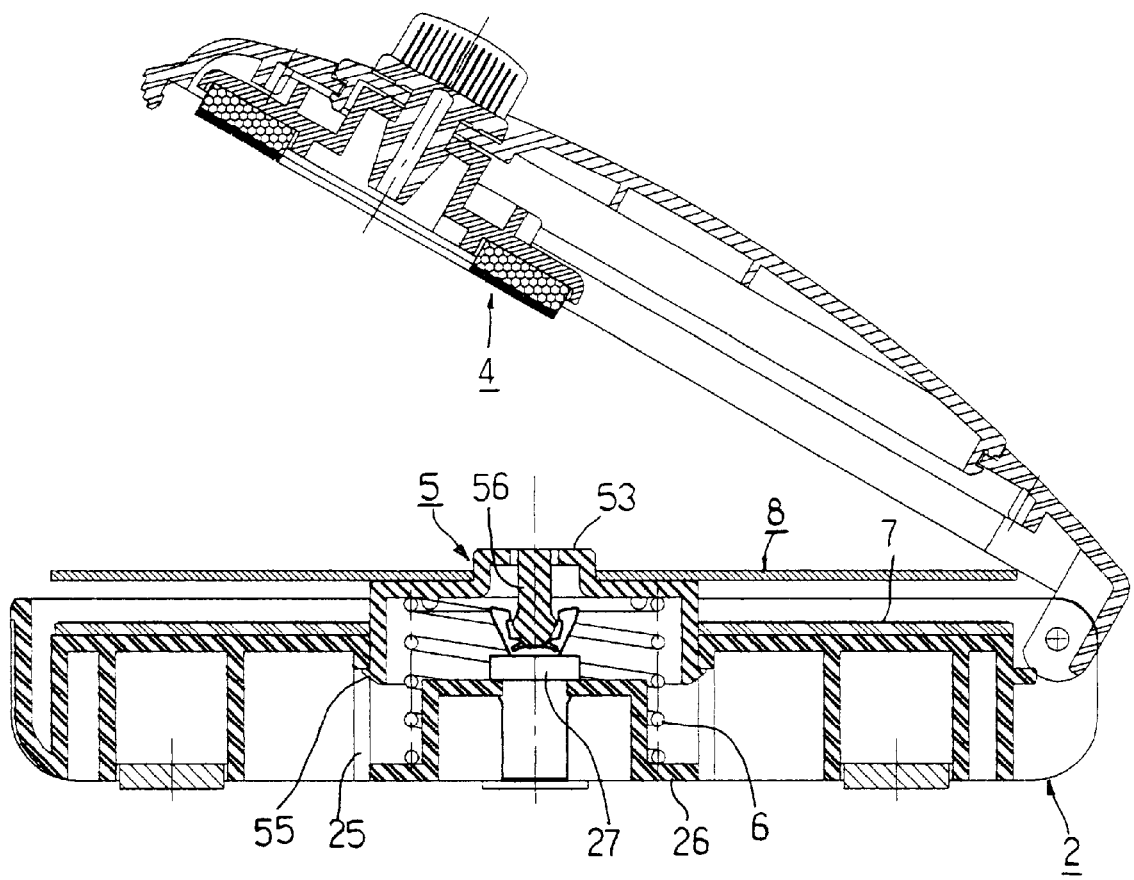
FIG. 5 is a sectional view of an integrated compact disc cleaning and labeling device according to a second embodiment of the present invention, wherein the device is ready for labeling a compact disc.
Figure 6:
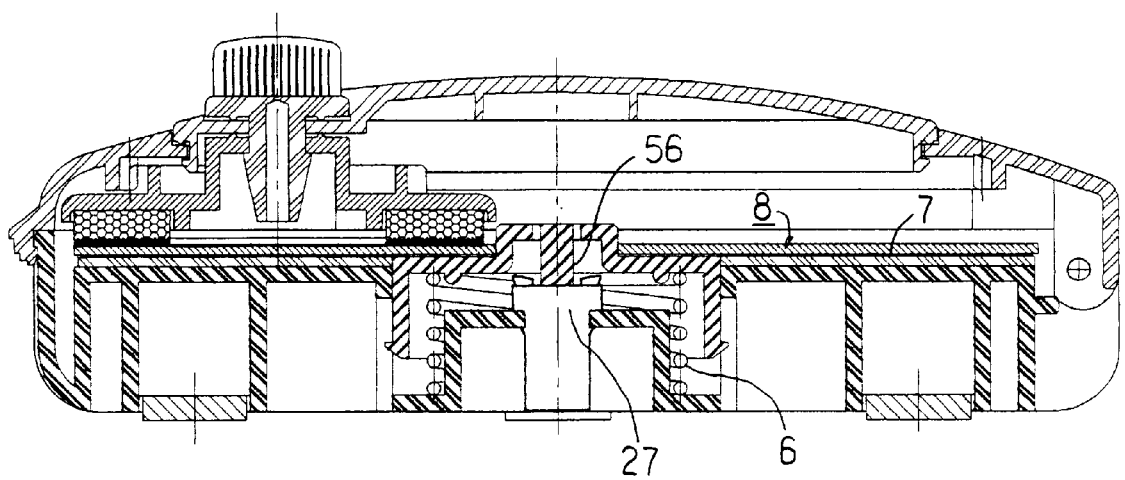
FIG. 6 shows the compact disc in the device of the present invention of FIG. 5 has been labeled.
Figure 7:
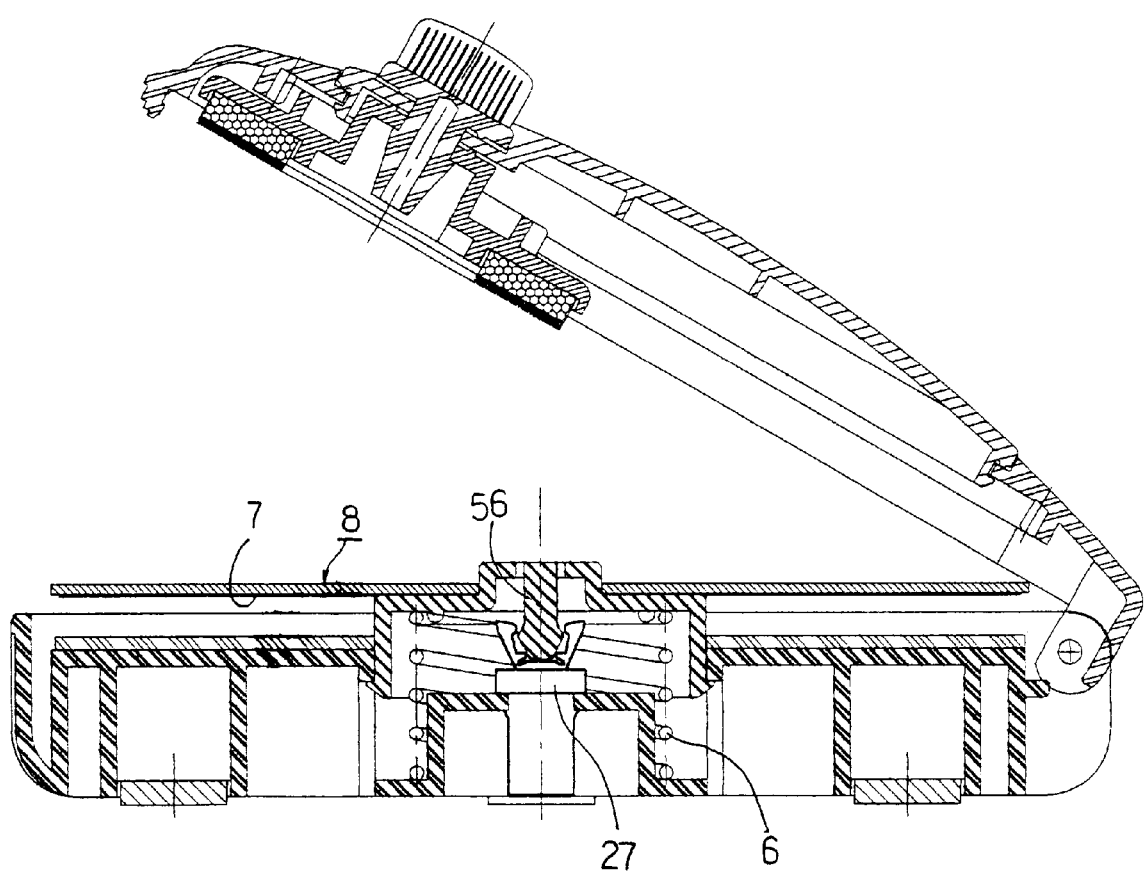
FIG. 7 shows the labeled compact disc of FIG. 6 is ready for removal from the device of the present invention.

FIGS. 5, 6 and 7 illustrate a second embodiment of the present invention. This second embodiment is generally similar to the first embodiment, except that the sleeve barrel 5 is provided at a lower surface of the raised central shaft portion 53 with a downward extended tenon 56, and that the internal base 26 of the bottom cover 2 is provided with an axially upward extended retaining member 27 corresponding to the tenon 56. Whereby when the sleeve barrel 5 is depressed and the return spring 6 is compressed, and the hooks 55 of the pawls 54 are guided by the guide slots 25 to the lower dead point, the tenon 56 is brought downward to fully engage into the retaining member 27 and keeps the sleeve barrel 5 in the lowered position. And when the sleeve barrel 5 is depressed again, the retaining member 27 disengages from the tenon 56 and the sleeve barrel 5 is pushed upward by the spring force of the previously compressed return spring 6. This second embodiment of the present invention employs an operative principle similar to that employed in the first embodiment. Wherein, FIG. 5 shows the device is ready for labeling a CD, FIG. 6 shows the CD is in contact with a label positioned in the device, and FIG. 7 shows the label has been attached to the CD and the top cover 1 is lifted for removal of the labeled CD from the device.

Figure 8:
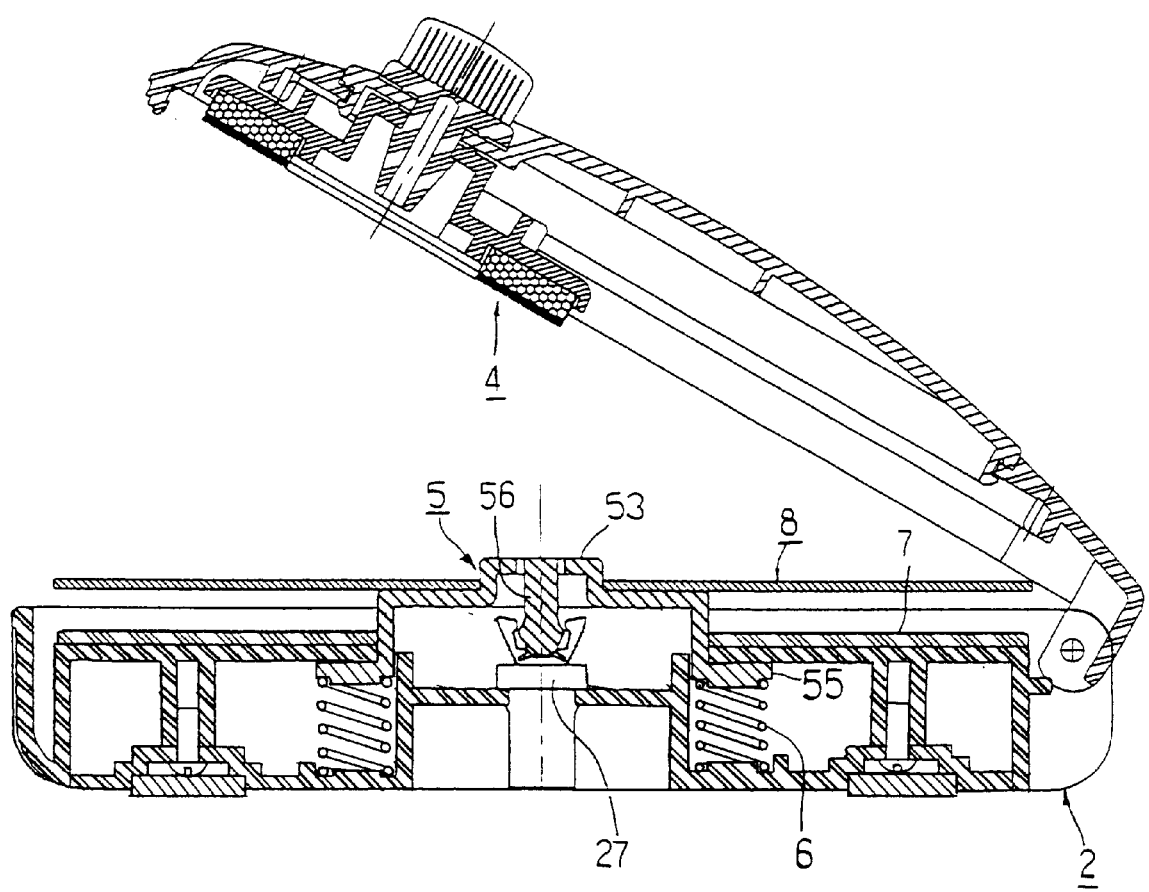
FIG. 8 is a sectional view of an integrated compact disc cleaning and labeling device according to a third embodiment of the present invention.

FIG. 8 shows a third embodiment of the present invention. In the first and the second embodiments, the return spring 6 is mounted at an inner side of the sleeve barrel 5 between the internal base 26 of the bottom cover 2 and the flat top portion 52 of the sleeve barrel 5. However, the return spring 6 in this third embodiment is mounted outside the internal base 26 and the sleeve barrel 5. The hooks 55 of the sleeve barrel 5 in this third embodiment radially outward extend by a predetermined distance, so that one or more return springs 6 are mounted around the internal base 26 between the extended hooks 55 and the bottom cover 2 to provide the same function of pushing the sleeve barrel 5 upward.

What is claimed is:

1. An integrated compact disc cleaning and labeling device, comprising:

a top cover being provided at an inner surface with a circle of continuous and radially inward projected teeth and at a top with a round opening;

a turning plate being rotatably fitted in said round opening on said top cover and having a through hole provided at one side of said turning plate;

a cleaning means being rotatably connected to said through hole on said turning plate and including a handling knob upward projected from said turning plate and a round member located below said turning plate to rotatably connected to said handling knob via said through hole on said turning plate; said round member being provided at a bottom surface with a cleaning element and at an outer peripheral wall surface with a circle of continuous and radially outward projected teeth adapted to mesh with said radially inward projected teeth of the top cover;

a bottom cover being pivotally connected at one side to said top cover by means of a pivot pin, such that said top cover could be pivotally turned about said pivot pin to lift from or close onto said bottom cover; said bottom cover including a barrel portion and an annular seat portion surrounding an outer peripheral area of said barrel portion, and said barrel portion being provided at a vertical wall thereof with a plurality of vertical guide slots and at an inner side with an internal base;

a sleeve barrel being telescopically received in said barrel portion of said bottom cover and including a vertically extended sleeve portion, a flat top portion, and a central shaft portion raised from a center of said flat top portion; said sleeve portion being provided at a vertical wall thereof with pawls having position and number corresponding to that of said guide slots of said bottom cover; and each of said pawls being provided at a lower end with a radially outward projected hook adapted to slide up and down in one of said guide slots; and a return spring being mounted between said bottom cover and said sleeve barrel to normally push said sleeve barrel to a lifted position.

2. The integrated compact disc cleaning and labeling device as claimed in claim 1, wherein said turning plate is provided along a lower outer peripheral edge with a circle of radially outward extended flange adapted to press against a lower outer edge of said round opening of said top cover when said turning plate is fitted into said round opening from an inner side of said top cover; and said top cover including an annular gasket fixed to the inner side thereof for shielding said flange of said turning plate, such that said turning plate is rotatably held to said top cover.

3. The integrated compact disc cleaning and labeling device as claimed in claim 1, wherein said top cover is provided at one side opposite to said pivot pin with a hook, and said bottom cover being provided with a retaining hole corresponding to said hook of said top cover, such that said top cover is closed onto said bottom cover with said hook engaged into said retaining hole.

4. The integrated compact disc cleaning and labeling device as claimed in claim 1, wherein said raised central shaft portion of said sleeve barrel is provided at a lower surface with a downward extended tenon, and said internal base of said bottom cover being provided with an axially upward extended retaining member corresponding to the tenon, and said tenon and said retaining member being adapted to detachably engage with each other.

5. The integrated compact disc cleaning and labeling device as claimed in claim 1, wherein a top of said annular seat portion of said bottom cover is covered with a mat.

6. The integrated compact disc cleaning and labeling device as claimed in claim 1, wherein said return spring is mounted inside said sleeve barrel between said internal base of said bottom cover and said flat top portion of said sleeve barrel.

7. The integrated compact disc cleaning and labeling device as claimed in claim 1, wherein said return spring is mounted outside said sleeve barrel between said bottom cover and said radially outward extended hooks of said sleeve barrel.

* * * * *